United States Patent [19]

Singh

[11] Patent Number: 4,563,901

[45] Date of Patent: Jan. 14, 1986

[54] TRANSDUCER

[75] Inventor: Gurnam Singh, Riverside, Calif.

[73] Assignee: International Telephone & Telegraph Corp., New York, N.Y.

[21] Appl. No.: 530,562

[22] Filed: Sep. 9, 1983

[51] Int. Cl.[4] .................... G01L 7/08; G01L 9/06
[52] U.S. Cl. .................................. 73/706; 73/721; 73/861.61
[58] Field of Search .............. 73/706, 716, 717, 718, 73/719, 720, 721, 722, 711, 182, 861.61

[56] References Cited

U.S. PATENT DOCUMENTS 3,712,143  1/1973  Weaver et al. ................... 73/720

Primary Examiner—Donald O. Woodiel
Attorney, Agent, or Firm—T. L. Peterson; R. C. Turner

[57] ABSTRACT

A dual differential pressure/static pressure unit including a housing and three approximately parallel diaphragms sealed therewith forming low and high pressure compartments. Incompressible fluid then fills the respective spaces between the center diaphragm and that on each side thereof. Differential pressure/static pressure sensors are then provided. The housing is provided with passageways to conduct each of said fluids to the respective high and low pressure sides of said sensors.

4 Claims, 6 Drawing Figures

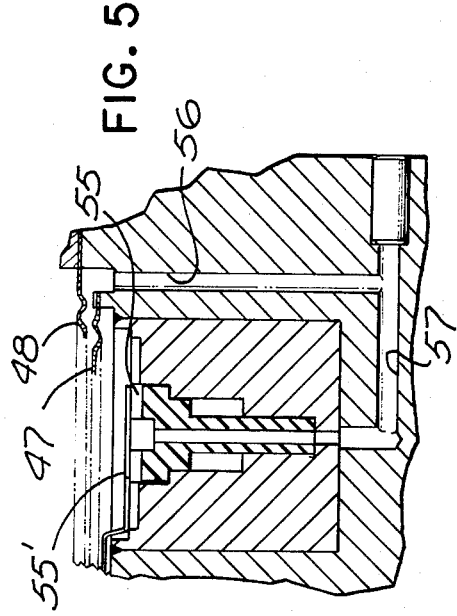
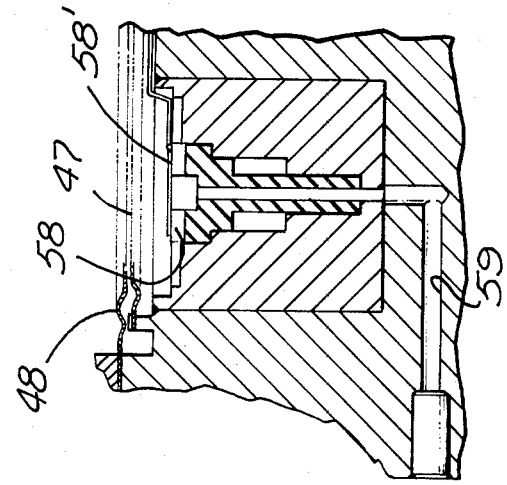
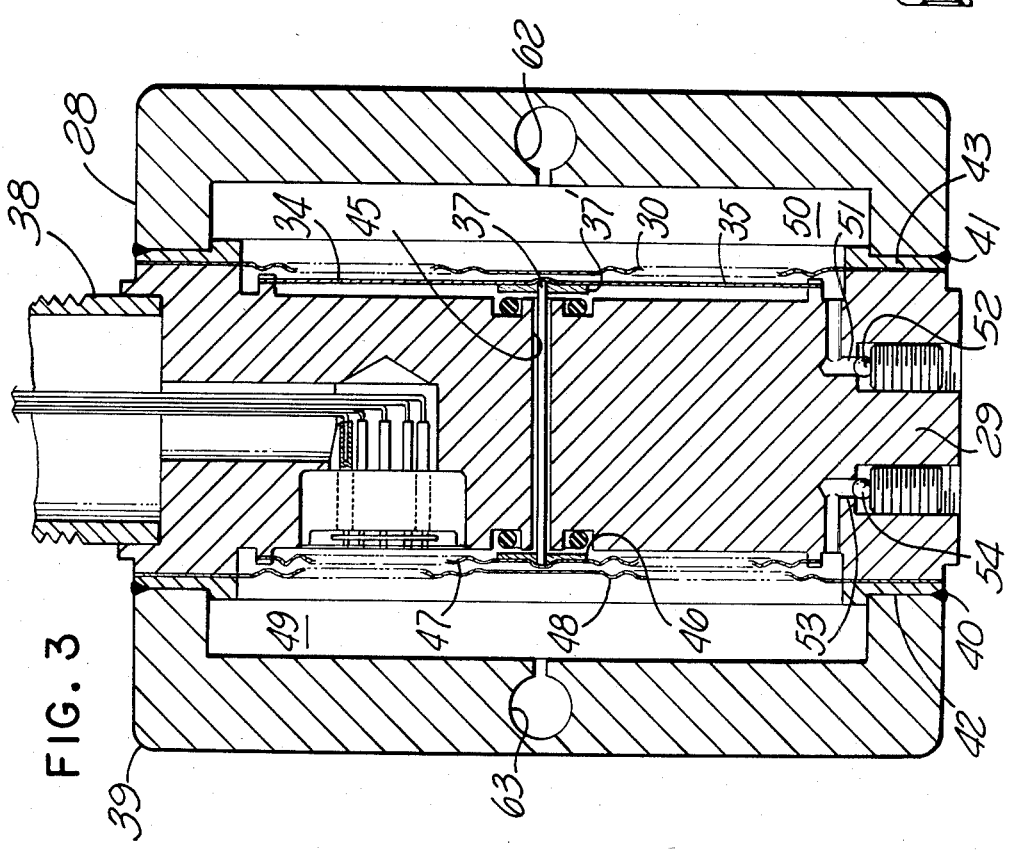

4,563,901

TRANSDUCER

BACKGROUND OF THE INVENTION

This invention relates to differential pressure/static pressure units, and more particularly to a differential pressure/static pressure unit having a diaphragm.

PRIOR ART STATEMENT

In the prior art, it has been the practice to connect two chambers of a device known as a differential pressure unit to a pipeline on opposite sides of an orifice therein. The DPU is a part of apparatus commonly called a transmitter. The output of the transmitter is then impressed upon a D.C. milliammeter, a process controller or otherwise. If desired, the milliammeter may be calibrated to read directly in pressure or differential pressure. Alternatively, the milliammeter may be calibrated to read directly in volume rate of flow. For example, the milliammeter may be calibrated to read in cubic feet per minute.

The most popular DPU in the past seems to have been of the double bellows type. For example, see U.S. Pat. Nos. 2,590,324 (issued Mar. 25, 1952); 2,917,081 (issued Dec. 15, 1959); 2,945,510 (issued July 19, 1960) and 3,343,420 (issued Sept. 26, 1967). However, metal diaphragm DPU's are not unknown. See U.S. Pat. Nos. 3,492,872 (issued Feb. 3, 1970) and 3,620,135 (issued Nov. 16, 1971). Metal diaphragms are also known in non-analogous arts. See U.S. Pat. Nos. 2,913,008 (issued Nov. 17, 1959) and 3,079,953 (issued Mar. 5, 1963). Metal diaphragms are preferred because of superior cleaning capability.

"Limp" diaphragms are shown at 23 and 24 in FIG. 2 and at 56 and 57 in FIG. 5 of U.S. Pat. No. 2,752,949, issued July 3, 1956. See also column 2, lines 68–72, of this patent.

It is old in the art to bond piezoresistive elements to a glass diaphragm. The electricaal outputs of the elements then are connected in a circuit by which a pressure or differential pressure is measured. Such a device is hereby defined for use herein as a pressure sensor.

SUMMARY OF THE INVENTION

In accordance with the transducer of the present invention, the above-described and other disadvantages of the prior art are overcome by providing a pressure unit having both differential and static responses.

BRIEF DESCRIPTION OF THE DRAWINGS

In the accompanying drawings which illustrate exemplary embodiments of the present invention:

FIG. 3 is a transverse sectional view of the transducer taken on the line 3—3 shown in FIG. 2;

FIG. 5 is a longitudinal sectional view through the transducer showing a differential pressure unit; and FIG. 6 is a longitudinal sectional view through the transducer showing a static pressure unit.

DESCRIPTION OF THE PREFERRED EMBODIMENTS

Figure 1:
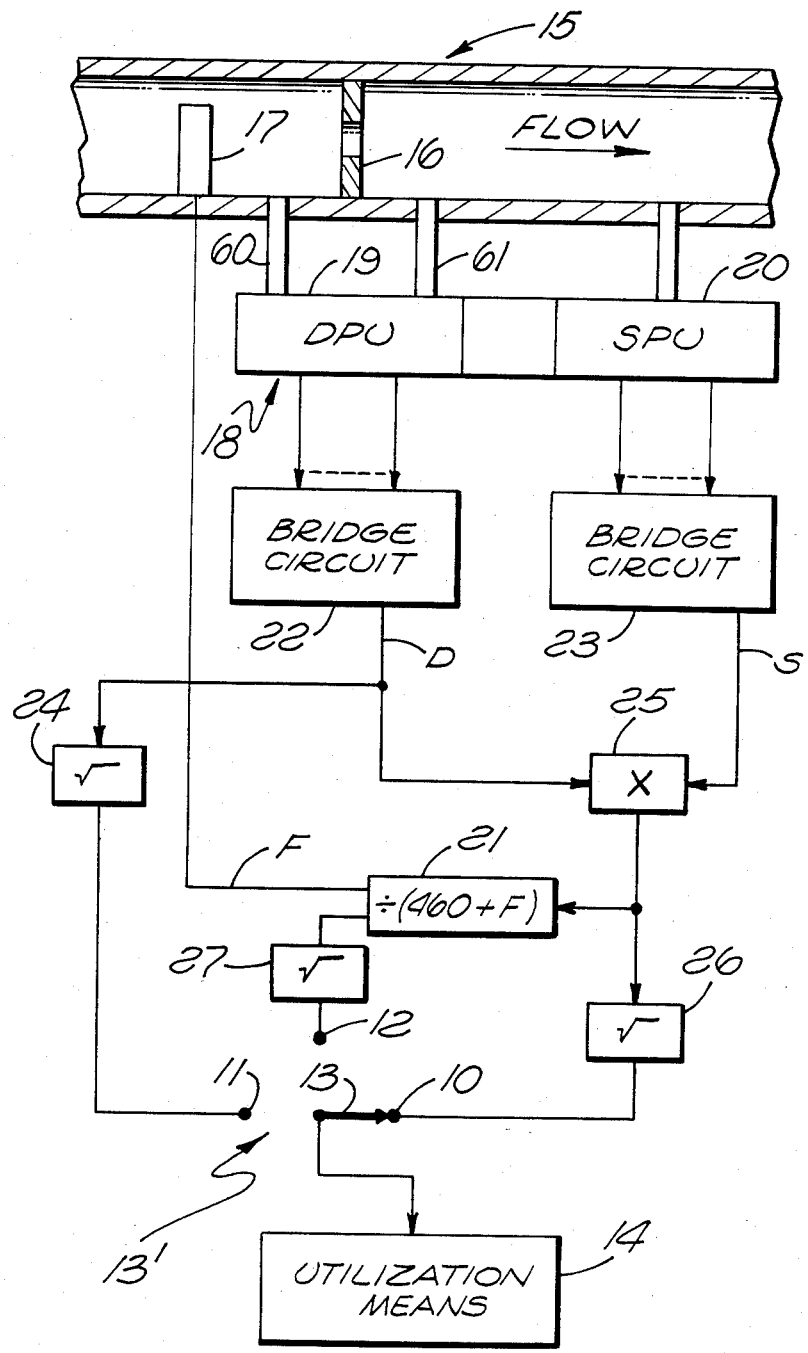
FIG. 1 is a diagrammatic view of one embodiment of the present invention.

In the drawings, in FIG. 1, gas and liquid flow rates can be obtained from terminals 10 and 11 without a temperature correction. A gas flow rate may be obtained with temperature correction F at a contact 12.

A single-pole, triple-pole switch is provided at 13' including a pole 13 that selectively engages one of the contacts 10, 11 and 12 with utilization means 14. Utilization means 14 may be an entirely conventional indicator, if desired.

The above-described and other portions of FIG. 1 include a pipeline 15, an orifice plate 16, a temperature probe 17, a transducer 18 including a differential pressure unit (DPU) 19 and a static pressure unit (SPU) 20.

Probe 17 is connected to a divider 21.

A bridge circuit 22 is connected from DPU 19. A bridge circuit 23 is connected from SPU 20.

The respective outputs D and S of circuits 22 and 23 are respectively proportional to the differential pressure across orifice plate 16 and the static pressure on the right hand side thereof.

Output D is connected to a square root extractor 24 and to a multiplier 25. Output S is connected to multiplier 25. The output of multiplier 25 is connected to divider 21 and to another square root extractor 26. The output of divider 21 is then connected to still another square root extractor 27.

Square root extractors 24, 26 and 27 are respectively connected to contacts 11, 10 and 12.

The outputs on contacts 11, 10 and 12 are proportional to flowrates $Q_a$, $Q_b$ and $Q_c$, respectively, where $$Q_a = C_a(D)^{\frac{1}{2}}$$

$$Q_b = C_b \left[ \frac{DS}{460 + F} \right]^{\frac{1}{2}}$$

$$Q_c = C_c(DS)^{\frac{1}{2}}$$

$C_a$, $C_b$ and $C_c$ are constants, and F is temperature in degrees Fahrenheit.

$Q_a$ is the flow rate of a liquid. $Q_b$ is a temperature compensated flow rate of a gas. $Q_c$ is a flow rate of a constant temperature gas.

Everything in FIG. 1 may be conventional except portions of transducer 18.

Figure 2:
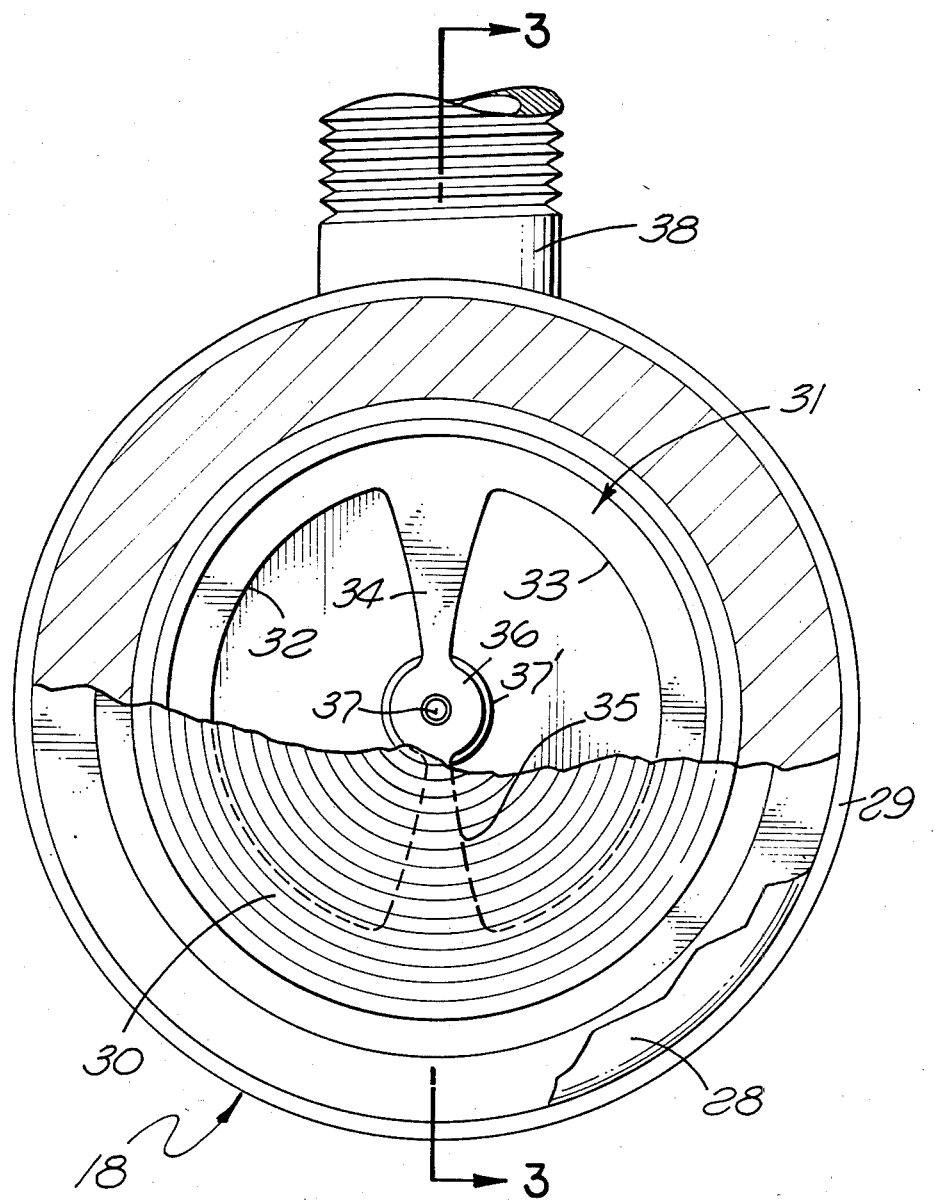
FIG. 2 is a broken-away front elevational view of a transducer constructed in accordance with the present invention.
Figure 4:
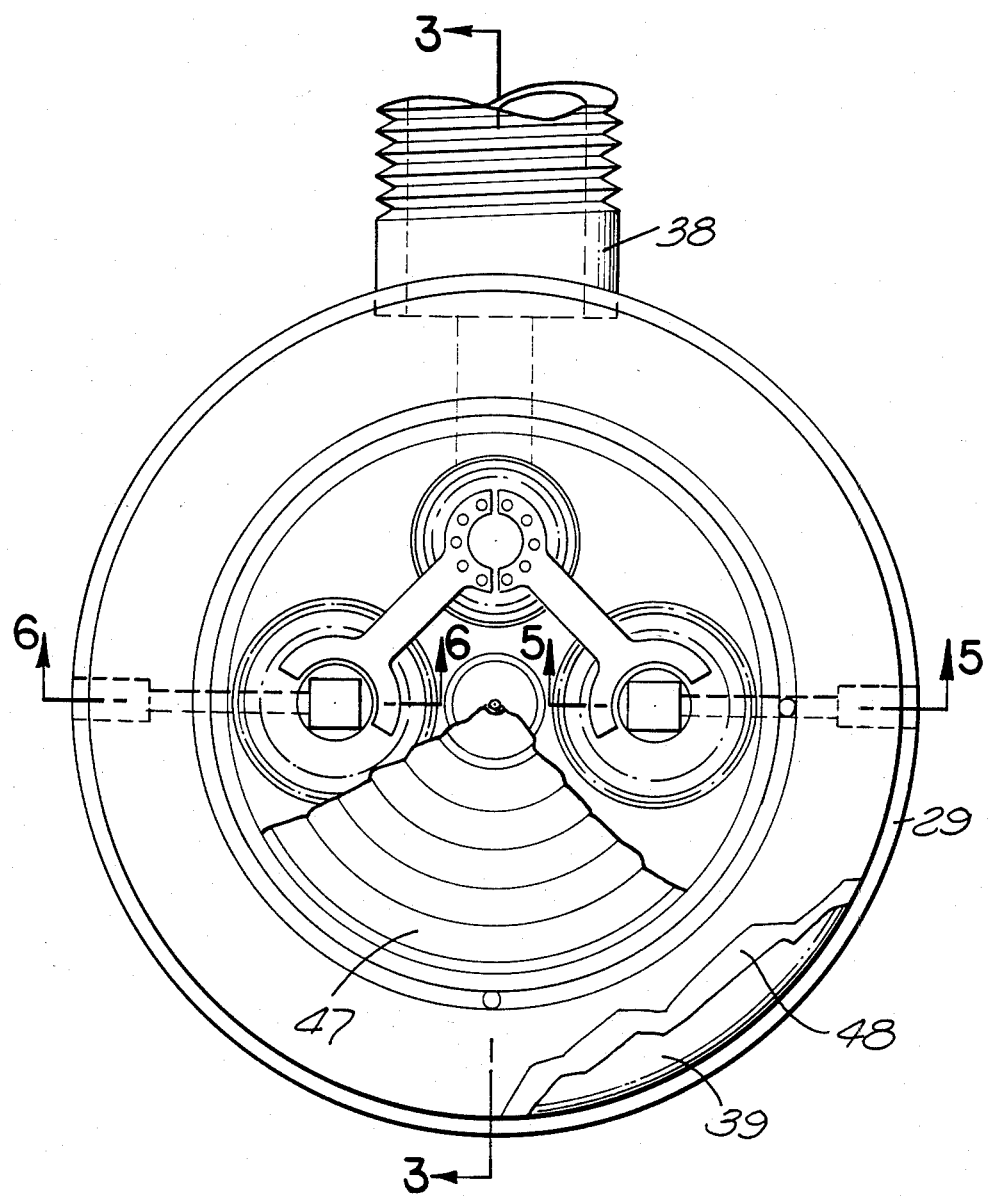
FIG. 4 is a broken-away rear elevational view of the transducer.

In FIG. 2, transducer 18 is shown having one end cover 28 welded to a body 29.

A corrugated diaphragm is provided at 30 in FIG. 2. Underneath diaphragm 30, an apertured disc 31 is provided. Disc 31 has apertures 32 and 33 forming leaf springs 34 and 35. Disc 31 and leaf springs 34 and 35 are essentially made from a single stamping, the latter two being connected with a center part 36 to which a shaft 37 and a plate 37' are fixed.

The purpose of this kind of spring is to add stiffness to the inner diaphragm without lowering DP/SP magnitude to which the silicon sensors 55' and 58' are exposed for output.

In FIG. 2, an electrical conduit 38 is fixed with body 29.

In FIG. 3, end covers 28 and 39 are shown welded at 40 and 41 to rings 42 and 43. Rings 42 and 43 are, in turn, fixed to body 29. An electrical connector is shown at 44.

Note will be taken from FIG. 3 that shaft 37 is slidable a small distance through, but spaced from the interior of a passageway 45. The left end of shaft 37 and a plate 46 are fixed to a corrugated diaphragm 47. Still a third corrugated diaphragm is provided at 48.

The fluid in pipeline 15 fills chambers 49 and 50 in FIG. 3. An incompressible first fill fluid extends behind the left face of diaphragm 30, around parts 34 and 35 through passageway 45 around shaft 37, and in the space between diaphragm 47 and the left face of body 29.

An incompressible second fill fluid lies in the space between diaphragms 47 and 48.

The first fill fluid is injected through a passageway 51 that is sealed by a ball valve 52.

The second fill fluid is injected through a passageway 53 that is sealed by a ball valve 54.

In FIG. 5, the space immediately below diaphragm 47 contains the first fill fluid. This fluid stresses a glass plate 55 included in DPU 19. Plate 55 has a plurality of silicon strain gages 55' bonded to the top thereof. The glass and the strain gages 55' are entirely conventional (PTQ-K10-625-100A, for example) and are sold by Kulite Semiconductor Inc. of Ridgefield, N.J. See also U.S. Pat. Nos. 3,654,579 and 3,739,315 issued Apr. 4, 1972 and June 12, 1973, respectively.

Passageways 56 and 57 carry the second fill fluid to the back of plate 55. The electrical outputs of the strain gages 55' are then proportional to the difference between the pressures of the first and second fill fluids.

FIG. 5 includes DPU 19. FIG. 6 includes SPU 20.

In FIG. 6, SPU 20 includes a glass plate 58 which has strain gages 58' thereon. Plate 58 and strain gages 58' may be entirely conventional as before, the same being sold by Kulite Semiconductor Inc.

In both of FIGS. 5 and 6, the strain gages 55' and 58' are connected to the conventional bridge circuits 22 and 23, respectively.

The pressure in passageway 59 in FIG. 6 is atmospheric pressure or the pressure of a vacuum.

In FIG. 3, conduits 60 and 61 (FIG. 1) connect with openings 62 and 63, respectively, in respective end covers 28 and 39.

Due to the pressure drop across orifice plate 16 in FIG. 1, the left hand side and the right hand side of body 29 in FIG. 3 may be called the low pressure side and the high pressure side, respectively.

This invention accomplishes a high signal to pressure diaphragm edge stress ratio by utilizing the said disc. This only adds stiffness to the pressure diaphragn without reducing the value of the measured differential and static pressure. It is clear to the person familiar in the art that higher edge stresses in the pressure diaphragm can add undesirable errors such as hysteresis, etc. to the measurements.

OPERATION

In FIG. 1, when square root extractor 24 is employed, DPU 19 produces an output signal directly proportional to the pressure drop across orifice plate 16. Bridge circuit 22 then converts this to an analog D, the square root of which is displayed by utilization means 14.

SPU 20 and bridge circuit 23 produce analog S directly proportional to the static pressure downstream of the orifice plate 16.

The square root of the output (DS) of the multiplier 25 is taken by 26 and the same indicated by means 14.

In the last alternative, the DS output of multiplier 25 is divided by (460+F.) and the square root taken by 27. The output of square root extractor 27 is then indicated by means 14.

What is claimed is:

1. In a differential pressure/static pressure dual unit, the combination comprising: a diaphragm; a housing having a central hole therethrough; a mechanism to stiffen the diaphragm with lowering measured value, said mechanism including a main disc fixed at its periphery to one side of said housing, said main disc having two symmetrically spaced apertures divided by a leaf spring; a rod extending through said central hole in a position fixed relative to the center of said leaf spring and fixed relative to the center of said diaphragm; one reinforcement disc bonded between said leaf spring and said rod; and another reinforcement disc bonded between said diaphragm and said rod to provide overpressure sealing valves.

2. A differential pressure/static pressure dual unit comprising: a housing having a central hole therethrough; outer and inner substantially parallel diaphragms sealed around said housing on one side thereof; a third diaphragm sealed around said housing on the other side thereof in a position approximately parallel to said outer and inner diaphragms; a first fill fluid in compression between said third and inner diaphragms; a second fill fluid in compression between said outer and inner diaphragms; a differential pressure sensor having a sensor side and an underside; a static pressure sensor having a sensor side and an underside; a first passageway in said housing to conduct said second fill fluid from the space between said outer and inner diaphragms to the underside of said differential pressure sensor; a second passageway in said housing to conduct said first fill fluid from the space between said third and inner diaphragms to the sensor sides of said differential pressure sensor and said static pressure sensor; and a third passageway in said housing to conduct atmospheric pressure to the underside of said static pressure sensor.

3. The invention as defined in claim 2, wherein a mechanism is provided to spring bias said inner diaphragm away from said third diaphragm, said inner diaphragm also seeing full line differential and static pressure but with increased stiffness equal to said spring providing higher ratio of transducer output to diaphragm edge stress.

4. The invention as defined in claim 3, wherein said mechanism includes a main disc fixed at its periphery to other side of said housing between said inner and third diaphragms, said main disc having two symmetrically spaced apertures divided by a leaf spring, a rod extending through said central hole in a position fixed relative to the center of said leaf spring and to the center of said diaphragms, one reinforcement disc bonded between said leaf spring and said rod, and another reinforcement disc bonded between said diaphragm and said rod.

* * * * *